United States Patent
Lie et al.

(10) Patent No.: US 9,696,451 B2
(45) Date of Patent: Jul. 4, 2017

(54) RESISTIVITY LOGGING TOOL WITH EXCITATION CURRENT CONTROL BASED ON MULTI-CYCLE COMPARISON

(71) Applicant: HALLIBURTON ENERGY SERVICES, INC., Houston, TX (US)

(72) Inventors: Joni Polili Lie, Singapore (SG); Alberto Quintero, Houston, TX (US); Abdul Qadir Shabbir, Singapore (SG); Daniel Viassolo, Katy, TX (US); Burkay Donderici, Houston, TX (US); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/904,917

(22) PCT Filed: Jun. 10, 2014

(86) PCT No.: PCT/US2014/041780
§ 371 (c)(1),
(2) Date: Jan. 13, 2016

(87) PCT Pub. No.: WO2015/191056
PCT Pub. Date: Dec. 17, 2015

(65) Prior Publication Data
US 2016/0139292 A1    May 19, 2016

(51) Int. Cl.
*G01V 3/00*    (2006.01)
*G01V 3/38*    (2006.01)
(Continued)

(52) U.S. Cl.
CPC .................. *G01V 3/38* (2013.01); *G01V 3/18* (2013.01); *G01V 3/24* (2013.01)

(58) Field of Classification Search
CPC ... G01V 3/28; G01V 3/38; G01V 3/18; G01V 3/20; G01V 3/22; G01V 3/24; G01V 3/26;
(Continued)

(56) References Cited

U.S. PATENT DOCUMENTS

| 3,262,050 A | 7/1966 | Threadgold et al. |
| 4,412,180 A | 10/1983 | Desbrandes |

(Continued)

FOREIGN PATENT DOCUMENTS

| EP | 0206706 | 12/1986 |
| EP | 0759563 | 2/1997 |

(Continued)

OTHER PUBLICATIONS

ARI, "Azimuthal Resistivity Imager," 1993 Schlumberger Wireline and Testing. Retrieved from the Internet: <http://www.slb.com/~/media/Files/resources/books/industry_articles/ari_client_book.ashx>.

(Continued)

*Primary Examiner* — Thang Le
(74) *Attorney, Agent, or Firm* — Iselin Law PLLC; Benjamin Fite (57) ABSTRACT

A resistivity logging system includes a plurality of excitation electrodes, at least one return electrode, and a plurality of monitor electrodes. The resistivity logging system also includes a controller that determines a level of excitation current to be emitted by at least one of the plurality of excitation electrodes during a subsequent excitation cycle based on a comparison of measured downhole parameter values corresponding to excitation current emitted in two previous excitation cycles.

20 Claims, 5 Drawing Sheets

(51) Int. Cl.
*G01V 3/24* (2006.01)
*G01V 3/18* (2006.01)

(58) Field of Classification Search
CPC . G01V 3/30; G01V 3/10; G01V 3/265; G01V 3/02; G01V 3/04; G01V 3/06; G01V 3/104; E21B 47/026; E21B 47/122; E21B 47/0905; E21B 47/09; E21B 47/011; E21B 47/12; E21B 47/101; E21B 47/102; G01N 27/223; G01N 33/246; G01R 27/18; G01R 27/20
USPC .................... 324/324–375; 340/853.1–853.9, 340/854.1–854.1, 855.1–855.9, 340/856.1–856.4
See application file for complete search history.

(56) References Cited

U.S. PATENT DOCUMENTS

| | | | |
|---|---|---|---|
| 4,484,139 A | 11/1984 | Bravenec | |
| 4,524,325 A | 6/1985 | Moore et al. | |
| 4,570,123 A | 2/1986 | Grosso | |
| 4,675,610 A | 6/1987 | Chapman et al. | |
| 4,675,611 A | 6/1987 | Chapman et al. | |
| 4,677,385 A | 6/1987 | Chapman et al. | |
| 4,677,386 A | 6/1987 | Chapman et al. | |
| 4,703,279 A | 10/1987 | Chapman et al. | |
| 4,714,889 A | 12/1987 | Chapman et al. | |
| 5,343,153 A | 8/1994 | Davies et al. | |
| 5,396,175 A | 3/1995 | Seeman | |
| 5,399,971 A | 3/1995 | Seeman et al. | |
| 5,510,712 A * | 4/1996 | Sezginer ................ | G01V 3/20 324/357 |
| 5,852,363 A * | 12/1998 | Smits ..................... | G01V 3/20 324/366 |
| 5,955,884 A | 9/1999 | Payton et al. | |
| 6,023,168 A | 2/2000 | Minerbo | |
| 6,060,885 A * | 5/2000 | Tabarovsky ............ | G01V 3/22 324/366 |
| 6,060,886 A | 5/2000 | Tabarovsky et al. | |
| 6,304,086 B1 | 10/2001 | Minerbo et al. | |
| 6,426,625 B1 * | 7/2002 | Samworth ............... | G01V 3/24 324/371 |
| 6,850,068 B2 * | 2/2005 | Chemali ................. | E21B 47/01 175/50 |
| 7,027,967 B1 | 4/2006 | Barber | |
| 9,081,114 B2 | 7/2015 | Nie et al. | |
| 9,239,402 B2 * | 1/2016 | Li .......................... | G01V 3/24 |
| 2007/0268782 A1 | 11/2007 | Pabon et al. | |
| 2008/0303526 A1 | 12/2008 | Itskovich et al. | |
| 2009/0082969 A1 | 3/2009 | Rabinovich et al. | |
| 2009/0309591 A1 | 12/2009 | Goodman et al. | |
| 2013/0234718 A1 | 9/2013 | Li et al. | |
| 2013/0257436 A1 | 10/2013 | Bittar et al. | |
| 2014/0306710 A1 | 10/2014 | Nie et al. | |
| 2016/0299247 A1 | 10/2016 | Viassolo et al. | |

FOREIGN PATENT DOCUMENTS

| | | |
|---|---|---|
| GB | 2159986 | 12/1985 |
| WO | 2009/039468 | 3/2009 |
| WO | 2009/120790 | 10/2009 |
| WO | 2013/066436 | 5/2013 |
| WO | 2015/023271 | 2/2015 |
| WO | 2015/191056 | 12/2015 |
| WO | 2015/191057 | 12/2015 |

OTHER PUBLICATIONS

AU Patent Examination Report No. 1, Dated Apr. 17, 2014, Appl. No. 2011329362, "Multi-Array Laterolog Tools and Methods with Differential Voltage Measurements," Filed Nov. 15, 2010, 3 pgs.
CA Examination Report, Dated Dec. 1, 2014, Appl No. 2,816,450, "Multi-Array Laterolog Tools and Methods with Differential Voltage Measurements," Filed Nov. 2, 2011, 3 pgs.
EP Extended Search Report, dated Apr. 29, 2015, Appl No. 12844905.5, "Multi-Array Laterolog Tools and Methods With Split Monitor Electrodes," Filed Jul. 13, 2012, 4 pgs.
PCT International Preliminary Report on Patentability, dated May 30, 2013, Appl No. PCT/US2011/058867, "Multi-Array Laterolog Tools and Methods with Differential Voltage Measurements", filed Nov. 2, 2011, 5 pgs.
PCT International Preliminary Report on Patentability, dated Nov. 26, 2012, Appl No. PCT/US2010/056645, "Multi-Array Laterolog Tools and Methods" filed Nov. 15, 2010, 3 pgs.
PCT International Preliminary Report on Patentability, Dated Nov. 26, 2013, Appl No. PCT/US12/46757, "Multi-array Laterlog Tools and Methods with Slit Monitor Electrodes," filed Jul. 13, 2012, 5 pgs.
PCT International Search Report and Written Opinion, dated Mar. 10, 2015, Appl No. PCT/US2014/041780,"Resistivity Logging Tool With Excitation Current Control Based on Multi-Cycle Comparison," filed Jun. 10, 2014, 9 pgs.
PCT International Search Report and Written Opinion, dated Feb. 1, 2011, Appl No. PCT/US2010/056645, "Multi-Array Laterolog Tools and Methods" filed Nov. 15, 2010, 8 pgs.
PCT International Search Report and Written Opinion, dated Sep. 28, 2012, Appl No. PCT/US2012/046757, "Multi-Array Laterolog Tools and Methods With Split Monitor Electrodes", filed Jul. 13, 2012, 8 pgs.
PCT International Search Report and Written Opinion, dated Feb. 27, 2012, Appl No. PCT/US2011/058867, "Multi-Array Laterolog Tools and Methods with Differential Voltage Measurements", filed Nov. 2, 2011, 9 pgs.
PCT International Search Report and Written Opinion, dated Feb. 27, 2015, Appl No. PCT/US2014/041782, "Resistivity Logging Tool with Excitation Current Control," filed Jun. 10, 2015, 9 pgs.
EP Examination Report, dated Sep. 16, 2016, Appl No. 14863061.9, "Resistivity Logging Tool with Excitation Current Control," Filed Jun. 10, 2014.
PCT International Preliminary Report on Patentability, dated Dec. 22, 2016, Appl No. PCT/US2014/041782, "Resistivity Logging Tool with Excitation Current Control," Filed Jun. 10, 2014, 6 pgs.
PCT International Preliminary Report on Patentability, dated Dec. 22, 2016, Appl No. PCT/US2014/041780, "Resistivity Logging Tool With Excitation Current Control Based on Multi-Cycle Comparison," filed Jun. 10, 2014, 6 pgs.

* cited by examiner

RESISTIVITY LOGGING TOOL WITH
EXCITATION CURRENT CONTROL BASED
ON MULTI-CYCLE COMPARISON

BACKGROUND

Modern oil field operators demand access to a great quantity of information regarding the parameters and conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including wireline logging and "logging while drilling" (LWD).

Among the available wireline and LWD tools are a variety of resistivity logging tools including, in particular, "laterolog" tools. Such tools typically include a central electrode around a tool body, with guard electrodes symmetrically spaced above and below the central electrode. The tool drives auxiliary currents between the guard electrodes and the center electrode to "focus" the current from the center electrode, i.e., to reduce dispersion of the current from the center electrode until after the current has penetrated some distance into the formation. Generally speaking, a greater depth of investigation can be achieved using more widely-spaced guard electrodes, but the vertical resolution of the measurements may suffer.

Laterolog tools employ a monitor electrode array to sense voltages resulting from injected currents. These voltages are analyzed to determine formation properties (e.g., resistivity) at different depths. Such measurements are affected by formation properties, borehole properties, and controllable parameters such as the excitation current level, the excitation current frequency, and amplifier gains. Laterolog tools that do not adequately manage controllable parameters may cause inaccuracies in the determination of formation properties.

DESCRIPTION OF THE DRAWINGS

Accordingly, there is disclosed herein a resistivity logging tool and methods for excitation current control.

It should be understood that the drawings and detailed description do not limit the disclosure, but on the contrary, they provide the foundation for one of ordinary skill to discern the alternative forms, equivalents, and modifications that are encompassed in the scope of the claims.

DETAILED DESCRIPTION

There are disclosed herein resistivity logging systems with excitation current control and related methods. Besides excitation current levels and frequencies, other parameters that may be controlled include amplifier gains. In one embodiment, a controller selects a set of excitation currents using a simulator that receives at least one measured downhole parameter value and that employs at least one constraint. As an example, the simulator may use a measured resistivity value and constraints such as a predetermined excitation current range, a minimum monitor electrode voltage threshold, and/or a maximum sum of amplified monitor electrode voltages to select a set of excitation currents to be emitted during an excitation cycle. Additionally or alternatively, the controller may employ a look-up table (LUT) with entries selected using one or more downhole parameter values. The LUT may be generated using simulation or modeling, and the results stored. As an example, a simulation may be performed using a range of resistivity values, a range of excitation currents, and various constraints. The excitation currents determined by the simulator to maximize monitor electrode voltages for a given formation resistivity without violating constraints are stored in a table or other format. Thereafter, the controller may retrieve the excitation currents for a given formation resistivity in response to a measured resistivity value or other measured downhole parameter value.

Additionally or alternatively, a controller may employ a multi-cycle comparison of measured downhole parameter values to select a subsequent cycle of excitation currents. For example, the ratios of voltages or resistivities corresponding to two previous excitation current cycles may be used to adjust excitation currents for a subsequent cycle up or down. Further, excitation currents for a subsequent cycle may be adjusted up or down by application of a damping factor that limits an amount of change between cycles and/or an optimization factor that compares a measured downhole parameter value to a threshold. As an example, the optimization factor may be the ratio of a maximum voltage observed by any pair of monitor electrodes with a desired voltage threshold. Such multi-cycle comparisons can be applied separately to each of a plurality of current frequencies used by the resistivity logging tool.

Figures 1, 2:
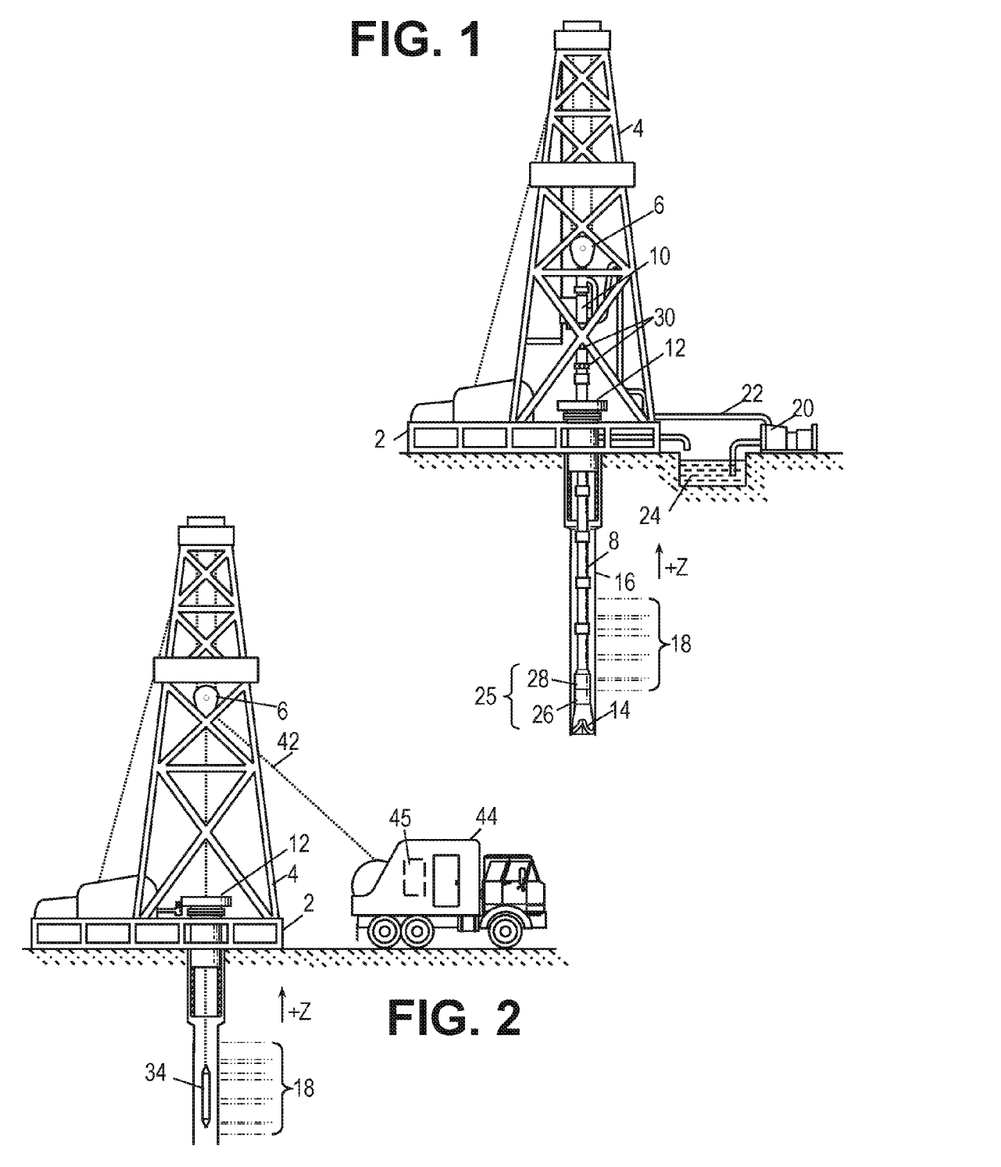
FIG. 1 shows an illustrative environment for logging while drilling ("LWD")
FIG. 2 shows an illustrative environment for wireline logging.
Figure 3:
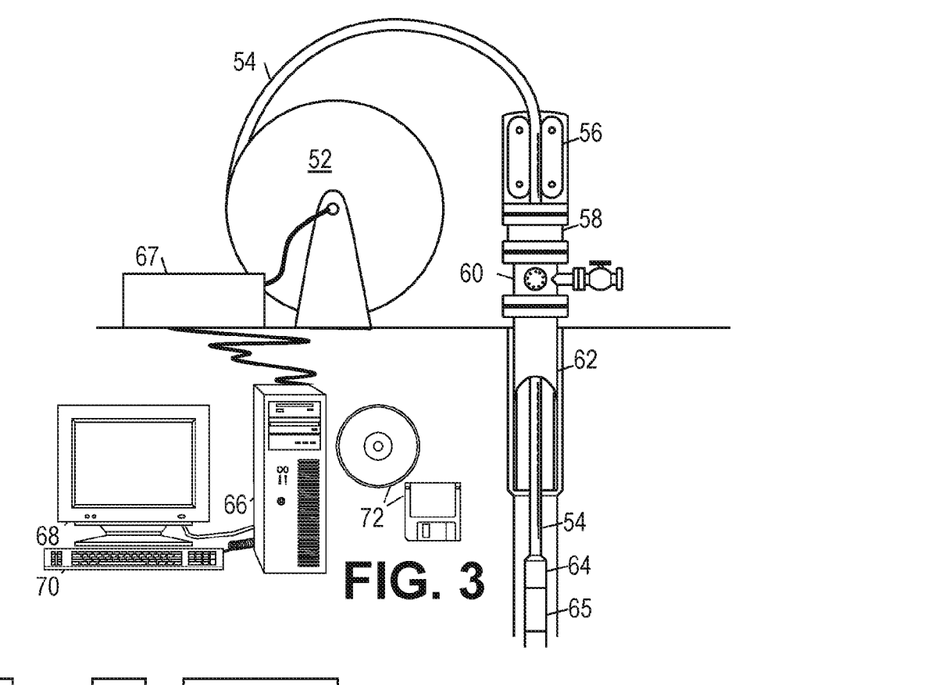
FIG. 3 shows an illustrative environment for tubing-conveyed logging.

The disclosed systems and methods are best understood in the context of the larger environments in which they operate. Suitable environments are illustrated in FIGS. 1-3. FIG. 1 shows an illustrative logging while drilling (LWD) environment. A drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via the annulus around drill string 8, and into a retention pit 24. The drilling fluid transports cuttings from the borehole 16 into the pit 24 and aids in maintaining the integrity of the borehole 16. Various materials can be used for drilling fluid, including oil-based fluids and water-based fluids.

As shown, logging tools 26 are integrated into the bottom-hole assembly 25 near the bit 14. As the bit extends the borehole through the formations, logging tools 26 collect measurements relating to various formation properties as well as the tool orientation and various other drilling conditions. Each of the logging tools 26 may take the form of a drill collar, i.e., a thick-walled tubular that provides weight and rigidity to aid the drilling process. For the present discussion, the logging tools 26 are expected to include a multi-array laterolog resistivity tool to measure formation resistivity. The bottom-hole assembly 25 also may include a telemetry sub 28 to transfer images and/or measurement data to a surface receiver 30 and to receive commands from the surface. In some embodiments, the telemetry sub 28 does not communicate with the surface, but rather stores logging data for later retrieval at the surface when the logging assembly is recovered.

At various times during the drilling process, the drill string 8 may be removed from the borehole 16 as shown in FIG. 2. Once the drill string has been removed, logging operations can be conducted using a wireline logging sonde 34 suspended by a cable 42 having conductors for transporting power to the logging sonde 34 and telemetry from the logging sonde 34 to the surface. In some embodiments, the logging sonde 34 may have pads and/or centralizing members to maintain the tool near the axis of the borehole as the tool is pulled uphole. The logging sonde 34 may include a variety of logging tools including a multi-array laterolog tool for measuring formation resistivity. A logging facility 44 collects measurements from the logging sonde 34, and includes a computer system 45 for processing and storing the measurements gathered by the sensors.

An alternative logging technique is tubing-conveyed logging. FIG. 3 shows an illustrative coil tubing logging system in which coil tubing 54 is pulled from a spool 52 by a tubing injector 56 and injected into a well 62 through a packer 58 and a blowout preventer 60. In the well 62, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub 64 and receive data to be conveyed to the surface computer system 66.

Surface computer system 66 is configured to communicate with supervisory sub 64 to set logging parameters and collect logging information from the one or more of the logging tools 65 such as a multi-array laterolog tool. Surface computer system 66 is configured by software (shown in FIG. 3 in the form of removable storage media 72) to monitor and control downhole instruments 64, 65. As shown, the computer system 66 may include a display device 68 and a user-input device 70 to enable a human operator to interact with the system control software 72.

In each of the foregoing logging environments, the logging tool assemblies may include a navigational sensor package having directional sensors for determining the inclination angle, the horizontal angle, and the rotational angle (a.k.a. "tool face angle") of the logging instruments. As is commonly defined in the art, the inclination angle is the deviation from vertically downward, the horizontal angle is the angle in a horizontal plane from true North, and the tool face angle is the orientation (rotational about the tool axis) angle from the high side of the wellbore.

Figure 4:
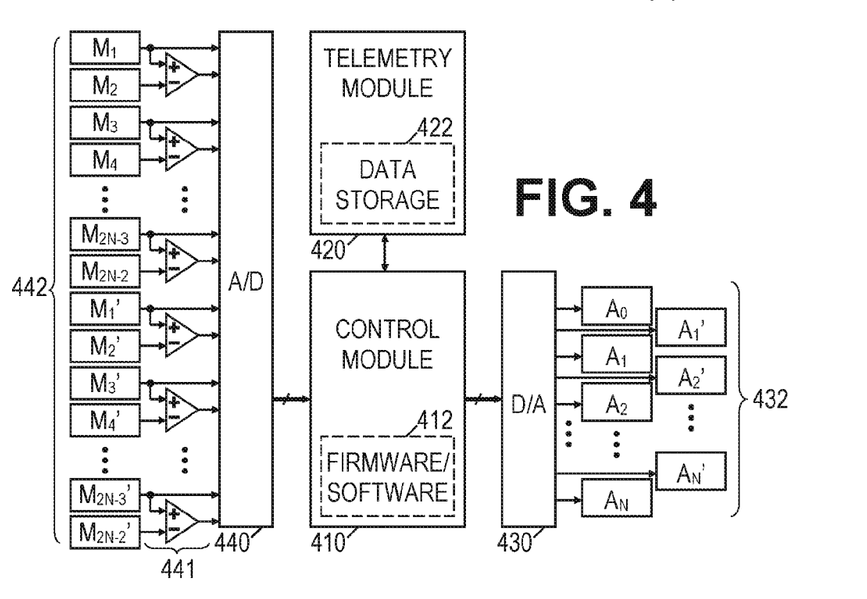
FIG. 4 is a block diagram of an illustrative multi-array laterolog tool.

FIG. 4 shows a functional block diagram of tool electronics for a multi-array laterolog tool. In FIG. 4, a control module 410 governs the operation of the tool in accordance with software and/or firmware 412 stored in internal memory. The control module 410 also couples to telemetry module 420 to receive commands and/or to provide measurement data to a surface computer or controller. Control module 410 further connects to digital-to-analog converter 430 to drive current electrodes 432, and connects to analog-to-digital converter 440 to obtain voltage measurements via monitor electrodes 442. Control module 410 can be, for example, a general purpose processor, a digital signal processor, a programmable gate array, or an application specific integrated circuit. Telemetry module 420 receives and stores measurement data in storage 422, which may correspond to non-volatile memory, and further operates as a communications interface between the control module 410 and other downhole or surface components.

FIG. 4 shows 2N+1 current electrodes (electrodes $A_0, A_1, A_2, \ldots A_N, A_1', A_2', \ldots A_N'$) being independently driven via digital-to-analog converter 430. In some tool embodiments, the guard electrodes are electrically connected in pairs, i.e., electrode $A_1$ is connected to electrode $A_1'$ by an electrical conductor, electrode $A_2$ is connected to electrode $A_2'$, etc. Moreover, the return electrodes are electrically connected (i.e., electrode $A_N$ is conductively coupled to electrode $A_N'$). In such alternative embodiments, the digital-to-analog converter can be simplified to drive only one electrode in each pair. Similarly, the monitor electrodes 442 can be electrically connected in pairs, i.e., with electrode $M_1$ connected to $M_1'$, electrode $M_2$ connected to $M_2'$, etc. Each monitor electrode can be individually driven/sensed and the control module can collect the pair-wise measurements by appropriately combining the individual electrode currents and voltages.

A series of differential amplifiers 441 provides the analog to digital converter 440 of FIG. 4 with differential voltage measurements between monitor electrode dyads, e.g., between monitor electrodes $M_1$ and $M_2$, between $M_3$ and $M_4 \ldots$, and between $M_{2N-3}$ and $M_{2N-2}$. Where the monitor electrodes are not connected in pairs, the analog to digital converter 440 further measures the voltages between monitor electrodes $M_1'$ and $M_2'$, between $M_3'$ and $M_4', \ldots,$ and between $M_{2N-3}'$ and $M_{2N-2}'$. For completeness, the analog to digital converter 440 may also measure the voltages of the odd-numbered monitor electrodes ($M_1, M_3, \ldots, M_{2N-3}, M_1', M_3', \ldots, M_{2N-3}'$). Other non-differential measurements could alternatively be used, such as the voltages of the even-numbered monitor electrodes, or the average voltage for each monitor electrode dyad. Given both the differential and non-differential measurements, the tool can determine the voltage for each monitor electrode.

The acquisition of differential measurements is desirable because such measurements are, in many cases, very small relative to the non-differential voltages. Moreover, the derived resistivity can be very sensitive to error in the differential values, so it is desirable to acquire these measurements with a dedicated, high accuracy analog-to-digital converter rather than digitizing the monitor electrode voltages separately before determining the differences.

Figure 5:
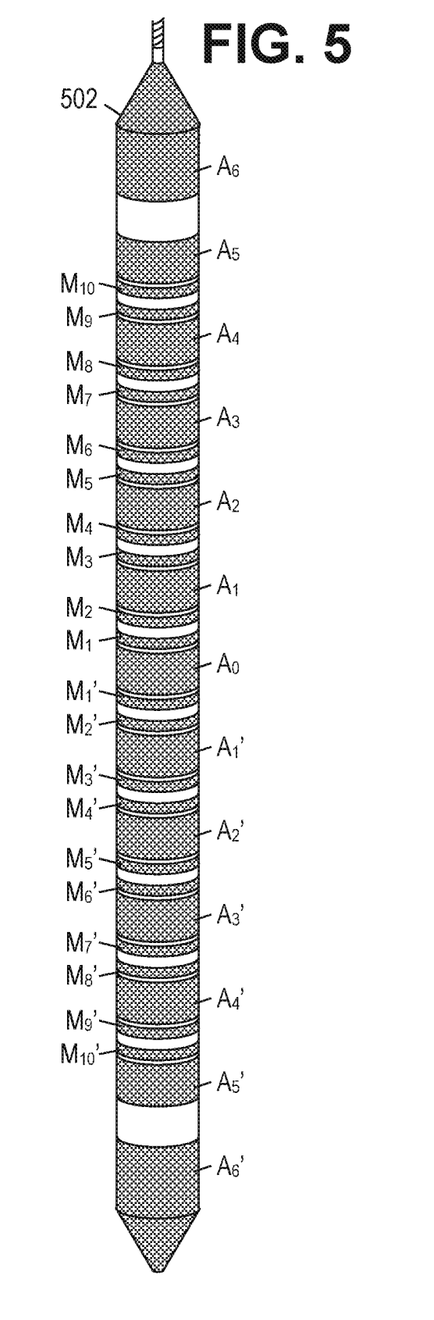
FIG. 5 shows an illustrative multi-array laterolog tool.

FIG. 5 shows an illustrative multi-array laterolog tool 502 having (for the sake of illustration) equally-spaced current electrodes and return electrodes (electrodes $A_0, A_1, A_2, \ldots A_6, A_1', A_2', \ldots A_6'$), with interspersed monitor electrodes $M_1$-$M_{10}$ and $M_1'$-$M_{10}'$ on a wireline tool body. (It is desirable to separate the monitor electrodes from the current electrodes because the current electrodes often develop an impedance layer that distorts voltage measurements when current is flowing.) This disclosure often groups the monitor electrodes into pairs and dyads. The term "pair" will be consistently used to refer to monitor electrodes symmetrically located relative to the center electrode, e.g., $M_1$ and $M_1'$, or $M_6$ and $M_6'$. The term "dyad" will be consistently used to refer to the two monitor electrodes between adjacent current electrodes (e.g., $M_1$ and $M_2$, or $M_5'$ and $M_6'$) or to the corresponding two monitor electrode pairs (e.g., the pair $M_1$ and $M_1'$, taken with the pair $M_2$ and $M_2'$, form a dyad of monitor electrode pairs).

Figure 6:
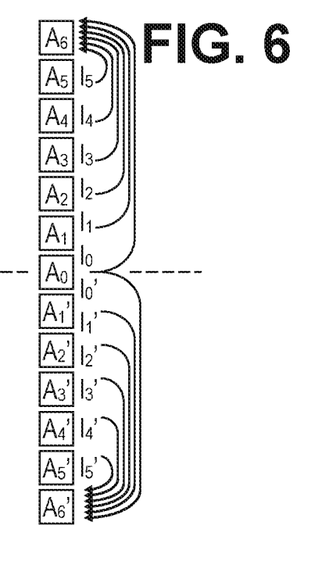
FIG. 6 illustrates a current flow pattern for a laterolog tool with six sets of guard electrodes.

Though the figure shows equally-spaced, uniformly-sized current electrodes, the electrodes are typically not equally sized and spaced. Better performance is achieved by having the more distant electrodes increase in size. The tool electronics employ the current electrodes to provide the currents $I_0$-$I_5$ and $I_0'$-$I_5'$ as illustrated in FIG. 6. Currents $I_0$-$I_5$ are sourced from electrodes $A_0$-$A_5$ respectively, with electrode $A_6$ serving as a common return electrode for each of these currents. Similarly, currents $I_0'$-$I_5'$ are sourced from electrodes $A_0$ and $A_1'$-$A_5'$ respectively, with electrode $A_6'$ serving as a common return electrode for these currents. If the current and monitor electrodes are pair-wise connected as discussed before, the tool operates on the combined currents ($I_0+I_0'$, $I_1+I_1'$, $I_2+I_2'$, . . . ). Otherwise, the tool can analyze currents $I_0$-$I_5$ separately from $I_0'$-$I_5'$, or in the alternative, combine the currents and voltages digitally before analyzing.

To enable the monitor electrodes to distinguish the effects of the various currents, the currents are given distinguishable features. In one tool embodiment, the electrodes are pair-wise connected and currents $I_0$-$I_5$ have distinguishable signal frequencies $f_0$-$f_5$. As an example, the set of frequencies may be selected in view of the conductivity of the borehole fluid. Further, the set of frequencies may be selected to enable fast logging, while not spreading the frequencies so far apart as to incur excessive frequency dependence in the resistivity measurements. Further, the set of frequencies may be selected to avoid the use of harmonic frequencies which could be unduly sensitive to nonlinear effects in the system. In some embodiments, the currents could be distinguished through the use of time-division multiplexing, code-division multiplexing, or other methods that enable the currents to be independently monitored.

While each of the currents is provided with a characteristic that makes its effects distinguishable from those of the other currents, in at least some tool embodiments some of the currents are given common features. For example, some tool embodiments provide current $I_0$ with frequencies $f_0$ and $f_1$. The sharing of frequency $f_1$ by both current $I_0$ and $I_1$ enables straightforward hardware focusing as described in greater detail below.

When tool electronics drive one or more of the current electrodes, the currents pass through the borehole fluid and the formation to reach the return electrodes, and create a field potential indicative of the resistivity of the materials along the various current flow paths. The voltage signals at each monitor electrode location are recorded, and a frequency analysis of the voltage signals (e.g., by Fourier transform, filtering, or least-squares curve fitting) separates out those voltage signal components attributable to each of the currents. With the measurements for the current flow pattern of FIG. 6, it becomes possible to derive the measurements not only as a function of tool position, but also as a function of radial distance from the borehole.

Figure 7:
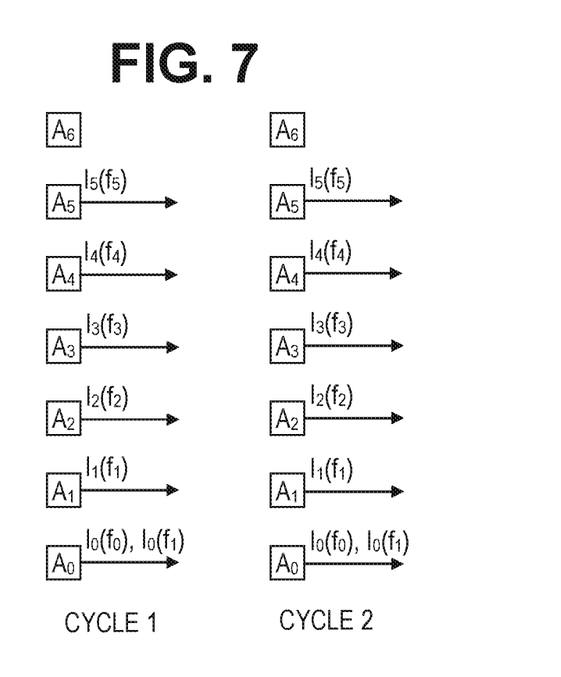
FIG. 7 illustrates a multi-cycle excitation current template for a laterolog tool.

FIG. 7 illustrates a two-cycle excitation current template for a laterolog tool. Relative to the tool embodiment shown in FIGS. 5 and 6, FIG. 7 shows only half of the guard electrodes. However, it should be understood that the same or similar two-cycle excitation current template applies to the other half of the guard electrodes. Also, the current paths to the return electrode $A_6$ are omitted in FIG. 7 as the focus is on the emitted excitation currents. In cycle 1, one or more outputs are selected from options: $I_0(f_0)$, $I_0(f_1)$, $I_1(f_1)$, $I_2(f_2)$, $I_3(f_3)$, $I_4(f_4)$, and $I_5(f_5)$ corresponding to electrodes $A_0$ to $A_5$. In cycle 2, a different set of outputs are selected from options: $I_0(f_0)$, $I_0(f_1)$, $I_1(f_1)$, $I_2(f_2)$, $I_3(f_3)$, $I_4(f_4)$, and $I_5(f_5)$. The same or similar outputs given for electrodes $A_0$ to $A_5$ in cycles 1 and 2 may also apply to other guard electrodes (e.g., electrodes $A_1'$ to $A_5'$). Cycles 1 and 2 may be repeated (i.e., cycles 1, 2, 1, 2, 1, 2, etc.) as needed. Further, updates to the selected outputs for each cycle are possible.

By using a current cycle pattern or template, the frequencies and emitting excitation electrodes for a particular cycle may be predetermined. However, the current amplitudes are independently determined or adjusted by a controller (e.g., control module 410). As used herein, a "cycle" refers to a period of time during which one or more excitation current pulses are emitted. After one cycle ends, another cycle of excitation current pulses may begin. Alternatively, cycles may be separated by time gaps. In at least some embodiments, a default excitation current cycle may be used initially. Once measurements corresponding to the default excitation current cycle are available, a controller is able to adjust excitation current levels, current frequency, and/or amplifier gain for a subsequent cycle as described herein.

Figure 8:
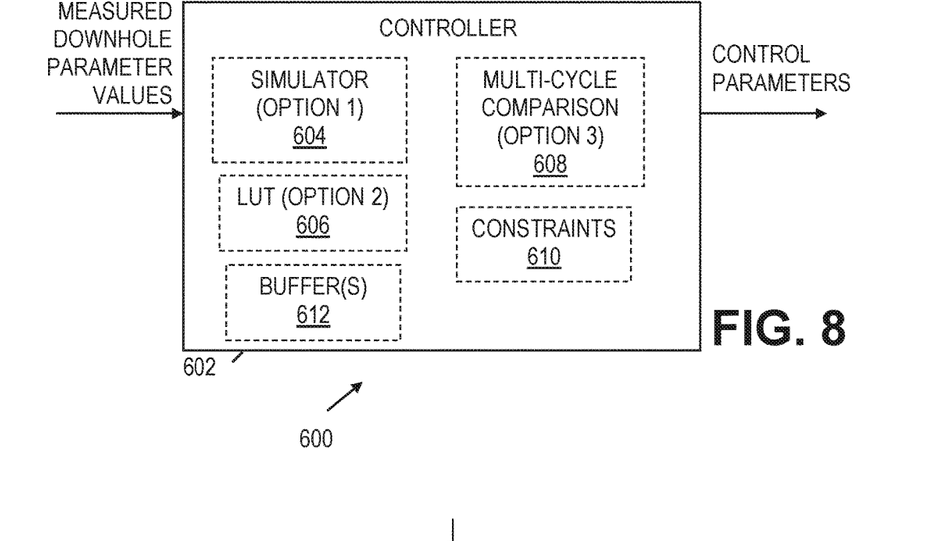
FIG. 8 shows a controller for selecting sets of excitation currents for a laterolog tool.

FIG. 8 shows a controller 602 for selecting sets of excitation currents for each of a plurality of cycles, current levels, current frequencies, amplifier gains, or other control parameters of a resistivity logging tool (e.g., laterolog tool 502). The controller 602 may correspond to the control module 410 of FIG. 4, the computer system 66 of FIG. 3, and/or the computer system 45 of FIG. 2. In other words, the controller 602 may be downhole, at the surface, or have both downhole and surface components/operations.

In at least some embodiments, the controller 602 employs a simulator 604 to select control parameters of a resistivity logging tool. The simulator 604 predicts the excitation currents to be used for a given formation in real-time subject to constraints 610. For example, the constraints 610 may ensure that excitation current levels are not so high so as to saturate pre-amplifiers associated with monitor electrodes, nor so low that measurements are not obtained. To achieve these goals, the simulator 604 may employ a feedback system that receives measured downhole parameter values and an optimizer that adjusts current levels in accordance with predetermined rules and/or constraints. In other words, the simulator 604 predicts the currents, which meet the constraints 610 and which generate signal voltages with high signal accuracy and integrity.

In one example, the simulator 604 determines control parameters for a laterolog array tool, where emitted currents produce voltage signals at the monitor electrodes. In such case, each voltage signal is a composite signal based on different frequency components which need to be separated and resolved. It should be appreciated that varying each control current has impact on all the voltages (the composite voltage signal is affected as well as individual frequency components). The simulator 604 may also account for pre-amplifier operations. The optimization determined by the simulator 604 maximizes the measured voltage to achieve greater accuracy without saturating measurement components. To increase these measured voltages, the currents injected into the formation are increased. Accordingly, in at least some embodiments, the simulator 604 selects currents such that all voltages remain within a predetermined measurement range and do not saturate the pre-amplifiers.

In at least some embodiments, the simulator 604 determines a solution for the optimization problem using linear programming where a cost objective is set to be minimized or maximized while conforming to certain constraints 610. Example constraints 610 include: 1) the receiver saturates at a predetermined threshold voltage level (e.g., 1 Vrms); 2) predicted currents should ensure that all voltages at monitor electrodes do not exceed receiver saturation thresholds; 3) predicted excitation currents should conform to a predetermined range (e.g., 0.1 mA-1 A); 4) individual voltage components ($I_y R_z$, where y=the number of different excitation currents used, and z varies depending on formation resistivity) should be larger than a threshold value (e.g., 1 μVrms) to ensure extraction from a composite signal is possible; 5) due to filtering limitations, the difference between individual voltage components ($I_y R_z$) should not vary by more than a threshold amount (e.g., within 1 or 2 orders of magnitude); and 6) the amplified sum of voltages should be less than a predetermined threshold (e.g., 2.5 V). The cost function outputs new excitation currents that maximize the received voltages while ensuring all constraints 610 are met.

In at least some embodiments, the simulator 604 performs a multi-step process. In the first step, the simulator 604 sets the amplifier and differential amplifier gains to 1. Thereafter, the simulator 604 solves for the excitation currents to be used for one or more formation resistivities subject to constraints 610 such as a minimum voltage threshold (e.g., all monitored voltages should be greater than 1 μV), a current range (e.g., 0.1 mA to 1 A) and a component voltage variance threshold (e.g., component voltages for the same electrode should be within 2 orders of magnitude of each other). This first step determines the minimum upper bound of excitation currents for each formation resistivity. In a second step, the simulator 604 solves for amplifier and differential amplifier gains using the currents found in step 1, such that the sum of the monitored voltages and/or the sum of the monitored differential voltages approach, but are less than, a saturation threshold (e.g., 2.5V). In a third step, the simulator 604 solves for the excitation currents to be used for one or more formation resistivities using the gains determined in step 2 and constraints 610 such as a minimum voltage threshold (e.g. all monitored voltages should be greater than 1 μV), a current range (e.g., 0.1 mA to 1 A), a component voltage variance threshold (e.g., component voltages for the same electrode should be within 2 orders of magnitude of each other), and a maximum sum of the monitored voltages and/or maximum sum of the monitored differential voltages (e.g., 2.5V). Step 3 determines the maximum lower bound of excitation currents for each formation resistivity. Is should be understood that some of the constraints may be relaxed as needed to obtain a solution. If needed, for example, the component voltage variance threshold may be adjusted to allow greater variance.

In at least some embodiments, the simulator 604 employs a feedback system, where a certain settling time is necessary. Accordingly, the controller 602 may output small excitation currents initially (e.g., by default). After a few iterations, the excitation current values determined by the simulator 604 converge and stabilize resulting in accurate resistivity logging. If the formation resistivity changes, the simulator 604 receives one or more measured downhole parameter values indicative of the change, and the solution for subsequent cycles of excitation current is updated. Generally, the amplifier gains and/or differential amplifier gains remain fixed once the simulator has determined their values. In contrast, the excitation currents are adjusted over time as described herein.

In at least some embodiments, the controller 602 employs a look-up table (LUT) 606 to select the excitation currents. The LUT 606 may be generated, for example, using the same or similar operations described for the simulator 604. In other words, excitation current solutions compliant with constrains 610 may be determined for each of a plurality of formation resistivities before logging operations provide real-time measurements. The simulated solutions populate the LUT 606 and are accessed during logging operations using one or more measured downhole parameter values (e.g., a resistivity value). With the LUT 606, the amount of time needed to determine a next or subsequent cycle of excitation currents is shortened since some or all of the simulation operations are performed before the logging operation. Thus, the LUT 606 option with "offline" simulation may be preferred over "online" simulation to ensure faster or more computationally efficient selection of excitation current updates during logging operations. However, it should be understood that suitable "online" simulations are possible and may be employed, especially given that processing and communication speeds continue to increase.

As previously explained, measurements collected by a laterolog array tool are separated according to the different frequencies. In summary, the following notations are used herein to describe the relevant currents and voltages: 1) the excitation current at electrode $A_k$ of frequency $f_k$ is $I_{Ak,fk}$ or is simplified as $I_k$; 2) the voltages at the $m^{th}$ monitor electrode for frequency $f_k$ is $V_{m,fk}$. To describe the multi-cycle comparison 608, the index n is used to denote the current time instant and the updating of the excitation current can be expressed as:

$$I_k(n+1) = \alpha_k \times I_k(n), \quad (1)$$

where $\alpha_k$ is a multiplier factor for the excitation current at electrode $A_k$ of frequency $f_k$.

In at least some embodiments, the multiplier factor is designed to adjust the voltage level for a monitor electrode to prevent saturation. Therefore, the multiplier factor is calculated based on the ratio of the resistivity level between the previous and current time instant. This resistivity level can be approximated based on the ratio between the voltage level at the monitor electrodes and the excitation current sent out.

$$\alpha_k = \frac{R_k(n-1)}{R_k(n)} = \frac{V_k(n-1)}{V_k(n)} \times \frac{I_{Ak}(n-1)}{I_{Ak}(n)}, \quad (2)$$

where $V_k$ denotes the measured voltages across the laterolog array tool due to the excitation current at $A_k$ and can be calculated as:

$$V_k = \Sigma_m V_{m,fk}. \quad (3)$$

In at least some embodiments, to regulate the change in current, a damping factor, k, is introduced to the multiplier $\alpha_k$ as given by:

$$\varsigma_k = \text{constant} \times \frac{V_k(n-1)}{V_k(n)}. \quad (4)$$

Therefore, the multiplier with the damping factor can be expressed as:

$$\alpha_k = \left\{ \frac{V_k(n-1)}{V_k(n)} \right\}^{\varsigma_k} \times \left\{ \frac{I_{Ak}(n-1)}{I_{Ak}(n)} \right\}^{\varsigma_k}. \quad (5)$$

The multiplier factor in equation (5) serves to update the level of excitation current in response to the change in resistivity. It does not ensure the maximum utilization of the dynamic range of the acquisition system. To maximize the dynamic range, the level of excitation currents can be updated based on the voltage level measured at the monitor electrodes. To serve this purpose, another multiplier factor is introduced in the updating the level of excitation current at electrode $A_k$. This multiplier can be calculated as the ratio between the desired voltage level and the observed voltage level at the monitor electrodes.

Since the observed voltage level varies depending on the location of the measure electrodes, the observed voltage level is chosen as the maximum voltage level observed at any pair of the measure electrodes across the array tool. Hence, this multiplier can be expressed as:

$$G = \frac{V_{desired}}{V_{max}} = \frac{V_{desired}}{\max_m \left( \sum_k V_{m,fk} \right)}, \quad (6)$$

where the operator $$\max_m (x_m),$$

outputs the maximum value amount the variables ($x_m$). Overall, the update equation for the excitation current at electrode $A_k$ can be summarized as:

$$I_k(n+1) = G \times \alpha_k \times I_k(n). \quad (7)$$

In at least some embodiments, the multi-cycle comparison 608 operations involve an initialization stage, an adaptation stage, and at least two buffers 612 (a present buffer and a past buffer). In the initialization stage, the excitation current is set at a small value. During the initialization stage, the level of excitation currents sent through the current electrodes are predetermined and set at initial levels. Further, the present and past buffers are initialized. In at least some embodiments, each buffer is able to store multiple currents $\{I_k\}$ and multiple monitoring voltages, $\{V_{m,fk}\}$ and $\{\Delta V_{m,fk}\}$.

For the first cycle of the initialization stage (n=1), one or more buffers 612 store the initial currents and signals received by the monitor electrodes. In some embodiments, the initialization stage also includes a second cycle (n=2), where the excitation signals are kept unchanged and new signals are collected by the monitor electrodes. The new signal may be stored in a present buffer and the measurements collected in response to the previous cycle (n=1) may be moved to a past buffer. With two sets of collected measurements, multi-cycle comparison operations can be performed to determine the level (amplitude) of excitation current for subsequent cycles. For example, a level of excitation current for a subsequent cycle can be calculated using at least some of the measurements from both the present and past buffers according to equation (7).

In the adaptation stage (n=3 or more), the excitation signals are no longer fixed and are calculated using the measurements collected in response to at least two previous excitation current cycles as described herein. The adaptation stage may continue until the logging process is terminated.

Figure 9:
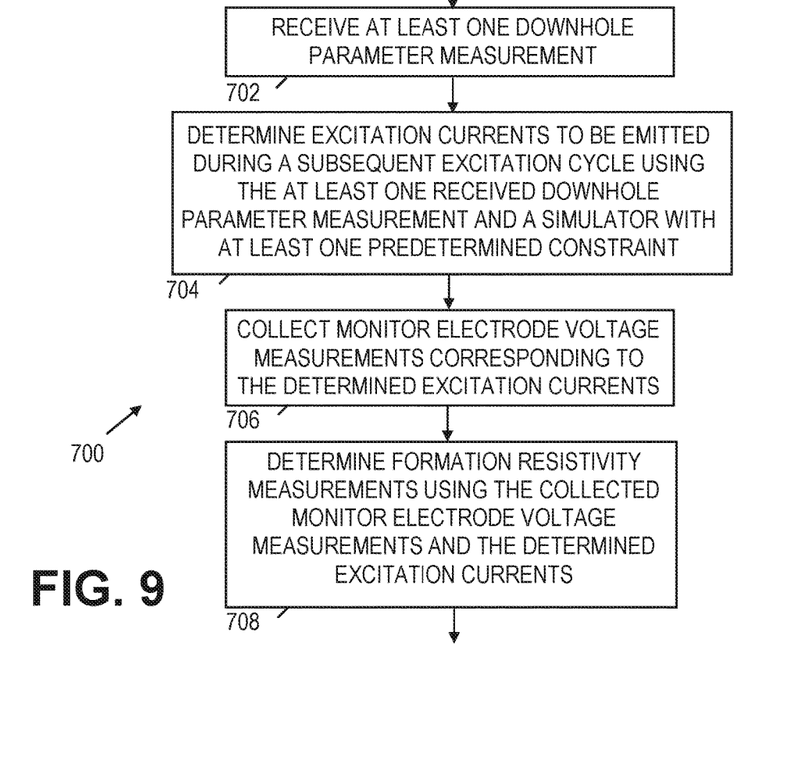
FIGS. 9-11 show flowcharts of illustrative excitation current control methods for a laterolog tool.
Figure 10:
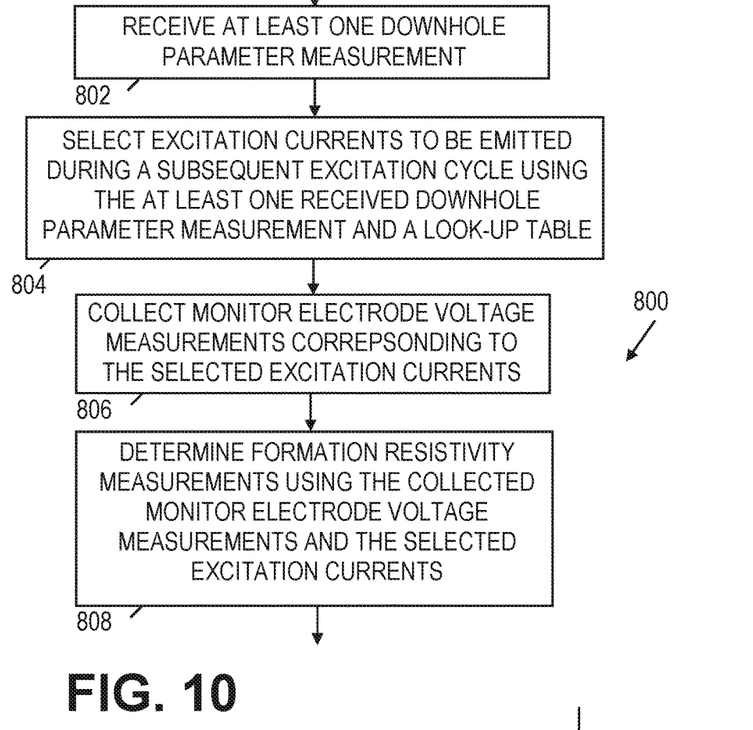
Figure 11:
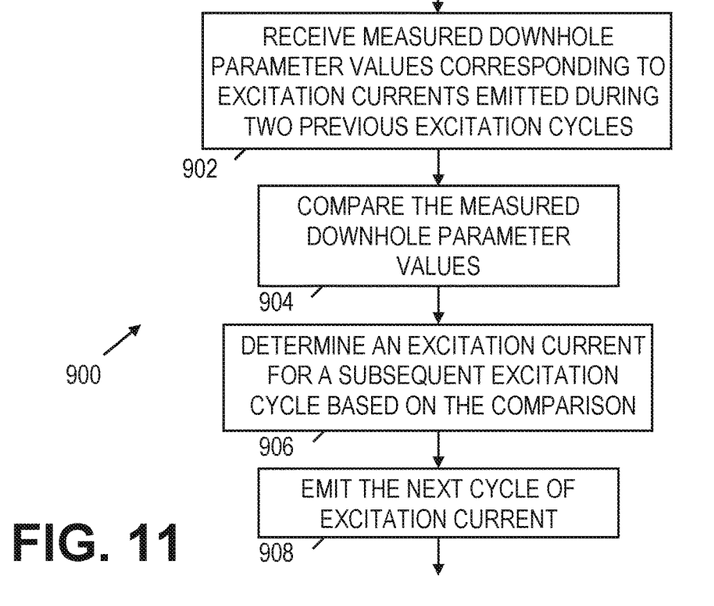

FIGS. 9-11 show flowcharts illustrating excitation current control methods 700, 800, 900 for a resistivity logging tool. The methods 700, 800, and 900 vary with regard to how a set of excitation currents for a given excitation cycle are determined or selected. In method 700 of FIG. 9, at least one downhole parameter measurement is received (block 702). A set of excitation currents are then determined for an excitation cycle using the at least one received downhole parameter measurement and a simulator with at least one constraint (block 704). At 706, monitor electrode voltage measurements are collected in response to the excitation currents. At 708, formation resistivity measurements are determined using the collected monitor electrode voltage measurements and the set of excitation currents.

In at least some embodiments, the method 700 may include additional steps. For example, the method 700 may include the step of determining monitor electrode amplifier gains using the at least one received downhole parameter measurement and the at least one predetermined constraint. Accordingly, the collecting monitor electrode voltage measurements may be based on the monitor electrode amplifier gains as well as the set of excitation currents.

In method 800 of FIG. 10, at least one downhole parameter measurement is received (block 802). A set of excitation currents is determined using the at least one received downhole parameter measurement and an LUT (block 804). The LUT values can be populated, for example, using a simulator with constraints as described herein. More specifically, at least one received downhole parameter measurement may be applied to an optimization problem (e.g., a linear programming function) that maximizes received monitor electrode voltages subject to at least one predetermined constraint. The received downhole parameter measurement may include, for example, a formation resistivity, a mud resistivity, and/or a borehole diameter. Meanwhile, constraints may include a predetermined excitation current range, a minimum monitor electrode voltage threshold, and/or a maximum sum of amplified monitor electrode voltages. At 806, monitor electrode voltage measurements are collected corresponding to the set of excitation currents. At 808, formation resistivity measurements are determined using the collected monitor electrode voltage measurements and the set of excitation currents.

In method 900 of FIG. 11, measured downhole parameter measurements corresponding to excitation current emitted during two previous excitation cycles are received (block 902). The measured downhole parameter values are compared at block 904. For example, the comparing step of block 904 may include determining a ratio of voltage measurements or resistivity measurements collected by at least two monitor electrodes as described herein. A level of excitation current to be emitted during a subsequent excitation cycle is determined based on the comparison (block 906). For example, the level of excitation current for a subsequent cycle may be determined by applying a multiplication factor to a level of excitation current emitted during a previous excitation cycle, where the multiplication factor corresponds to a ratio (see e.g., equations 1 and 2), a damping factor (see e.g., equations 4 and 5), an optimization factor, and/or a combination of factors (see e.g., equation 7) as described herein. At block 908, the determine excitation currents is emitted. In at least some embodiments, excitation current to be emitted in the subsequent excitation cycle has a common frequency with the excitation current emitted in previous excitation cycles, but the current amplitudes may vary.

While the methods 700, 800, 900 are described without discussing multiple excitation current frequencies, it should be understood that methods 700, 800, 900 may select or determine excitation currents at multiple frequencies. For example, the method 900 may determine excitation currents to be emitted during a subsequent cycle for each of a plurality of frequencies based on a comparison of measured downhole parameter values corresponding to excitation currents at each of the plurality of frequencies emitted in two previous excitation cycles.

Embodiments disclosed herein include:

A: A resistivity logging system that comprises a plurality of excitation electrodes, at least one return electrode, a plurality of monitor electrodes, and a controller that determines a level of excitation current to be emitted by at least one of the plurality of excitation electrodes during a subsequent excitation cycle based on a comparison of measured downhole parameter values corresponding to excitation current emitted in two previous excitation cycles.

B: A method for determining resistivity of a downhole formation, where the method comprises receiving measured downhole parameter values corresponding to excitation current emitted during two previous excitation cycles, comparing the measured downhole parameter values, determining a level of excitation current to be emitted during a subsequent excitation cycle based on the comparison, and emitting the determined level of excitation current.

Each of the embodiments, A and B may have one or more of the following additional elements in any combination: Element 1: the excitation current to be emitted during the subsequent excitation cycle has a common frequency with the excitation current emitted in the two previous excitation cycles. Element 2: the comparison comprises a ratio of voltage measurements collected by at least two of the monitor electrodes. Element 3: the comparison comprises a ratio of resistivity measurements. Element 4: the level of excitation current to be emitted during the subsequent excitation cycle is determined by applying a multiplication factor to a level of excitation current emitted in a previous excitation cycle, wherein the multiplication factor is based on the comparison. Element 5: the level of excitation current to be emitted during the subsequent excitation cycle is determined by applying a damping factor to a level of excitation current emitted in a previous excitation cycle, wherein the damping factor limits an amount of change between the level excitation current to be emitted during the subsequent excitation cycle and the level of excitation current emitted in the previous excitation cycle. Element 6: the level of excitation current to be emitted during the subsequent excitation cycle is determined by applying an optimization factor to a level of excitation current emitted in a previous excitation cycle, wherein the optimization factor is based on a comparison of at least one of the measured downhole parameter values with a predetermined threshold value. Element 7: the at least one of the measured downhole parameter values comprises a maximum voltage observed by any pair of the monitor electrodes. Element 8: the controller determines a level of excitation current to be emitted during the subsequent excitation cycle for each of a plurality of frequencies based on a comparison of measured downhole parameter values corresponding to excitation currents for each of the plurality of frequencies emitted in the two previous excitation cycles. Element 9: the plurality of excitation electrodes are positioned between a pair of return electrodes on a tool body, and wherein a pair of monitor electrodes are positioned between each adjacent pair of excitation electrodes.

Element 10: the excitation current to be emitted during the subsequent excitation cycle has a common frequency with the excitation current emitted during the two previous excitation cycles. Element 11: said comparing comprises determining a ratio of voltage measurements collected by at least two monitor electrodes. Element 12 said comparing comprises determining a ratio of resistivity measurements. Element 13: determining the level of excitation current to be emitted during the subsequent excitation cycle comprises applying a multiplication factor to a level of excitation current emitted in a previous excitation cycle, wherein the multiplication factor is based on the comparison. Element 14: determining the level of excitation current to be emitted during the subsequent excitation cycle comprises applying a damping factor to a level of excitation current emitted in a previous excitation cycle, wherein the damping factor limits an amount of change between the level of excitation current to be emitted during the subsequent excitation cycle and the level of excitation current emitted in the previous excitation cycle. Element 15: determining the level of excitation current to be emitted during the subsequent excitation cycle comprises applying an optimization factor to a level of excitation current emitted in a previous excitation cycle, wherein the optimization factor is based on a comparison of at least one of the measured downhole parameter values with a predetermined threshold value. Element 16: the at least one of the measured downhole parameter values comprises a maximum voltage observed by any pair of the monitor electrodes. Element 17: further comprising determining a level of excitation current to be emitted during the subsequent excitation cycle for each of a plurality of frequencies based on a comparison of measured downhole parameter values corresponding to excitation currents at each of the plurality of frequencies emitted in the two previous excitation cycles. Element 18: determining the level of excitation current to be emitted during the subsequent excitation cycle comprises applying an optimization ratio and a damping ratio to a level of excitation current emitted during two previous excitation cycles.

Numerous variations and modifications will become apparent to those skilled in the art once the above disclosure is fully appreciated. It is intended that the claims be interpreted to embrace all such variations and modifications.

What is claimed is:

1. A resistivity logging system that comprises:
   a logging tool deployable in a borehole, the logging tool having a plurality of excitation electrodes, at least one return electrode, and a plurality of monitor electrodes; and
   a controller for the logging tool, wherein the controller is configured to receive measured downhole parameter values corresponding to excitation current emitted by at least one of the plurality of excitation electrodes in two previous excitation cycles of the logging tool, and wherein the controller is configured to determine a level of excitation current to be emitted by at least one of the plurality of excitation electrodes during a subsequent excitation cycle of the logging tool based on a comparison of the measured downhole parameter values corresponding to excitation current emitted by the at least one of the plurality of excitation electrodes in the two previous excitation cycles of the logging tool.

2. The system of claim 1, wherein the excitation current to be emitted during the subsequent excitation cycle has a common frequency with the excitation current emitted in the two previous excitation cycles.

3. The system of claim 1, wherein the comparison comprises a ratio of voltage measurements collected by at least two of the monitor electrodes.

4. The system of claim 1, wherein the comparison comprises a ratio of resistivity measurements.

5. The system of claim 1, wherein the level of excitation current to be emitted during the subsequent excitation cycle is determined by applying a multiplication factor to a level of excitation current emitted in a previous excitation cycle, wherein the multiplication factor is based on the comparison.

6. The system of claim 1, wherein the level of excitation current to be emitted during the subsequent excitation cycle is determined by applying a damping factor to a level of excitation current emitted in a previous excitation cycle, wherein the damping factor limits an amount of change between the level excitation current to be emitted during the subsequent excitation cycle and the level of excitation current emitted in the previous excitation cycle.

7. The system of claim 1, wherein the level of excitation current to be emitted during the subsequent excitation cycle is determined by applying an optimization factor to a level of excitation current emitted in a previous excitation cycle, wherein the optimization factor is based on a comparison of at least one of the measured downhole parameter values with a predetermined threshold value.

8. The system of claim 7, wherein the at least one of the measured downhole parameter values comprises a maximum voltage observed by any pair of the monitor electrodes.

9. The system of claim 1, wherein the controller determines a level of excitation current to be emitted during the subsequent excitation cycle for each of a plurality of frequencies based on a comparison of measured downhole parameter values corresponding to excitation currents for each of the plurality of frequencies emitted in the two previous excitation cycles.

10. The system of claim 1, wherein the plurality of excitation electrodes are positioned between a pair of the return electrodes on a tool body, and wherein a pair of the monitor electrodes are positioned between each adjacent pair of excitation electrodes.

11. A method for resistivity logging, the method comprising:
deploying a logging tool downhole, the logging tool having a plurality of excitation electrodes, at least one return electrode, and a plurality of monitor electrodes;
receiving, by a controller for the logging tool, measured downhole parameter values corresponding to excitation current emitted during two previous excitation cycles of the logging tool;
comparing, by the controller, the measured downhole parameter values;
determining, by the controller, a level of excitation current to be emitted during a subsequent excitation cycle of the logging tool based on the comparison; and
emitting, by at least one of the plurality of excitation electrodes, the determined level of excitation current.

12. The method of claim 11, wherein the excitation current to be emitted during the subsequent excitation cycle has a common frequency with the excitation current emitted during the two previous excitation cycles.

13. The method of claim 11, wherein said comparing comprises determining a ratio of voltage measurements collected by at least two of the monitor electrodes.

14. The method of claim 11, wherein said comparing comprises determining a ratio of resistivity measurements.

15. The method of claim 11, wherein determining the level of excitation current to be emitted during the subsequent excitation cycle comprises applying a multiplication factor to a level of excitation current emitted in a previous excitation cycle, wherein the multiplication factor is based on the comparison.

16. The method of claim 11, wherein determining the level of excitation current to be emitted during the subsequent excitation cycle comprises applying a damping factor to a level of excitation current emitted in a previous excitation cycle, wherein the damping factor limits an amount of change between the level of excitation current to be emitted during the subsequent excitation cycle and the level of excitation current emitted in the previous excitation cycle.

17. The method of claim 11, wherein determining the level of excitation current to be emitted during the subsequent excitation cycle comprises applying an optimization factor to a level of excitation current emitted in a previous excitation cycle, wherein the optimization factor is based on a comparison of at least one of the measured downhole parameter values with a predetermined threshold value.

18. The method of claim 17, wherein the at least one of the measured downhole parameter values comprises a maximum voltage observed by any pair of the monitor electrodes.

19. The method of claim 11, further comprising determining a level of excitation current to be emitted during the subsequent excitation cycle for each of a plurality of frequencies based on a comparison of measured downhole parameter values corresponding to excitation currents at each of the plurality of frequencies emitted in the two previous excitation cycles.

20. The method of claim 11, wherein determining the level of excitation current to be emitted during the subsequent excitation cycle comprises applying an optimization ratio and a damping ratio to a level of excitation current emitted during two previous excitation cycles.

* * * * *